(12) United States Patent
Epalle et al.

(10) Patent No.: US 11,358,732 B2
(45) Date of Patent: Jun. 14, 2022

(54) ANTI-OVERPRESSURE FUEL TANK

(71) Applicant: Zodiac Aerotechnics, Roche la Moliere (FR)

(72) Inventors: Patrick Epalle, Saint Chamond (FR); Michel Vacher, Roche la Moliere (FR)

(73) Assignee: Zodiac Aerotechnics, Roche la Moliere (FR)

( * ) Notice: Subject to any disclaimer, the term of this patent is extended or adjusted under 35 U.S.C. 154(b) by 299 days.

(21) Appl. No.: 16/380,358

(22) Filed: Apr. 10, 2019

(65) Prior Publication Data

US 2019/0233131 A1 Aug. 1, 2019

Related U.S. Application Data

(62) Division of application No. 15/545,090, filed as application No. PCT/FR2016/050085 on Jan. 18, 2016, now Pat. No. 10,293,953.

(30) Foreign Application Priority Data

Feb. 5, 2015 (FR) ...................................... 1550916

(51) Int. Cl.
*B64D 37/32* (2006.01)
*F16K 24/04* (2006.01)
(Continued)

(52) U.S. Cl.
CPC ............. *B64D 37/32* (2013.01); *B64D 37/02* (2013.01); *F16K 24/048* (2013.01); *F16K 31/22* (2013.01);
(Continued)

(58) Field of Classification Search
CPC ....... B64D 37/32; B64D 37/02; F16K 24/048; F16K 24/042; F16K 31/22; F16K 31/18;
(Continued)

(56) References Cited

U.S. PATENT DOCUMENTS

| 2,276,136 A | 3/1942 | Wolley |
| 2,845,937 A | 8/1958 | Ksieski |
| 3,002,522 A | 10/1961 | Klinefelter |

(Continued)

FOREIGN PATENT DOCUMENTS

| CH | 396770 A | 7/1965 |
| DE | 2047815 A1 | 3/1972 |

(Continued)

OTHER PUBLICATIONS

ISA European Patent Office, International Search Report and Written Opinion for corresponding International Application No. PCT/FR2016/050085, dated Apr. 22, 2016 in the French and English languages (25 pgs).

*Primary Examiner* — Andrew D Perreault
(74) *Attorney, Agent, or Firm* — Harris Beach PLLC

(57) ABSTRACT

A fuel tank with a venting system includes a flap for closing and opening a vent made in the tank. The flap is coupled to a float. The flap includes a valve coupled to a second float mounted in a hinged manner in the tank so that the valve adopts a closed position, being pushed by the second float when the level of fuel in the tank reaches a certain threshold, and an open venting position in order to prevent overpressure within the tank, being driven by the second float when the level of fuel is below the threshold and the force exerted by the internal pressure on the valve is less than the sum of the forces exerted on the valve by the atmospheric pressure and by the weight of the second float.

2 Claims, 1 Drawing Sheet

(51) Int. Cl.
*B64D 37/02* (2006.01)
*F16K 31/22* (2006.01)
*B60K 15/03* (2006.01)
*B60K 15/035* (2006.01)

(52) U.S. Cl.
CPC ............... *B60K 15/03519* (2013.01); *B60K 2015/03289* (2013.01)

(58) Field of Classification Search
CPC . F16K 31/20; F16K 31/24; B60K 2015/0328; B60K 15/03519
USPC .......................................... 220/746; 137/202
See application file for complete search history.

(56) References Cited

U.S. PATENT DOCUMENTS

| | | | |
|---|---|---|---|
| 3,018,787 A | | 1/1962 | Kirk, Jr. |
| 3,340,887 A | * | 9/1967 | Peters .................... F16K 24/048 137/202 |
| 3,355,862 A | * | 12/1967 | Blanchet ............... F16K 24/048 96/164 |
| 3,394,724 A | | 7/1968 | Klinefelter |
| 5,031,655 A | | 7/1991 | Hebaus |

FOREIGN PATENT DOCUMENTS

| | | | |
|---|---|---|---|
| EP | 2532590 A1 | 12/2012 | |
| FR | 2299264 A2 | 8/1976 | |
| FR | 2327469 A1 | 5/1977 | |
| WO | WO-198911446 A1 | 11/1989 | |
| WO | WO-200212009 A2 | 2/2002 | |

\* cited by examiner

ANTI-OVERPRESSURE FUEL TANK

CROSS-REFERENCE TO RELATED APPLICATIONS

This application is a divisional of and claims priority to and the benefit of co-pending U.S. provisional patent application Ser. No. 15/545,090, ANTI-OVERPRESSURE FUEL TANK, filed Jul. 20, 2017, PCT/FR2016/050085, filed Jan. 18, 2016, and FR 1550916, filed Feb. 5, 2015, all of which applications are incorporated herein by reference in its entirety.

FIELD OF THE APPLICATION

The application relates to fuel tanks, particularly it concerns a fuel tank equipped with a venting system.

BACKGROUND

A fuel tank, of an aircraft for example, can be equipped with a venting system of the type comprising a flap for equalization of the internal pressure of the tank and the atmospheric pressure.

SUMMARY

A fuel tank with a venting system includes a flap for closing and opening a vent made in the tank. The flap is coupled to a float and is mounted in a hinged manner in the tank so as to adopt a closed position, being pushed by the float when the level of fuel in the tank reaches a certain threshold, and an open venting position, being driven by the float when the level of fuel is below the threshold. The flap includes a valve coupled to a second float mounted in a hinged manner in the tank so that the valve adopts a closed position, being pushed by the second float when the level of fuel in the tank reaches a certain threshold, and an open venting position in order to prevent overpressure within the tank, being driven by the second float when the level of fuel is below the threshold and the force exerted by the internal pressure on the valve is less than the sum of the forces exerted on the valve by the atmospheric pressure and by the weight of the second float.

The second float can be subjected to the valve by means of an arm forming a lever in order to increase the force exerted by the second float on the valve.

An anti-overpressure fuel tank includes a tank. A venting system of the tank includes a float mounted in a hinged manner in the tank. A flap is mechanically coupled to the float. The flap closes an opening in the tank in a closed flap position. A valve is disposed in the flap. The valve is mechanically coupled to a second float mounted in a hinged manner in the tank. The valve includes an open valve position to open an orifice in the flap and a closed valve position to close the orifice in the flap. The valve adopts a closed position, being pushed by the second float when the level of fuel in the tank reaches a certain threshold. The valve adopts an open venting position during the closed flap position in order to prevent overpressure within the tank, being driven by the second float when the level of fuel is below the threshold and the force exerted by the internal pressure on the valve is less than the sum of the forces exerted on the valve by the atmospheric pressure and by the weight of the second float.

The second float can be coupled to the valve by means of an arm forming a lever in order to increase the force exerted by the second float on the valve.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
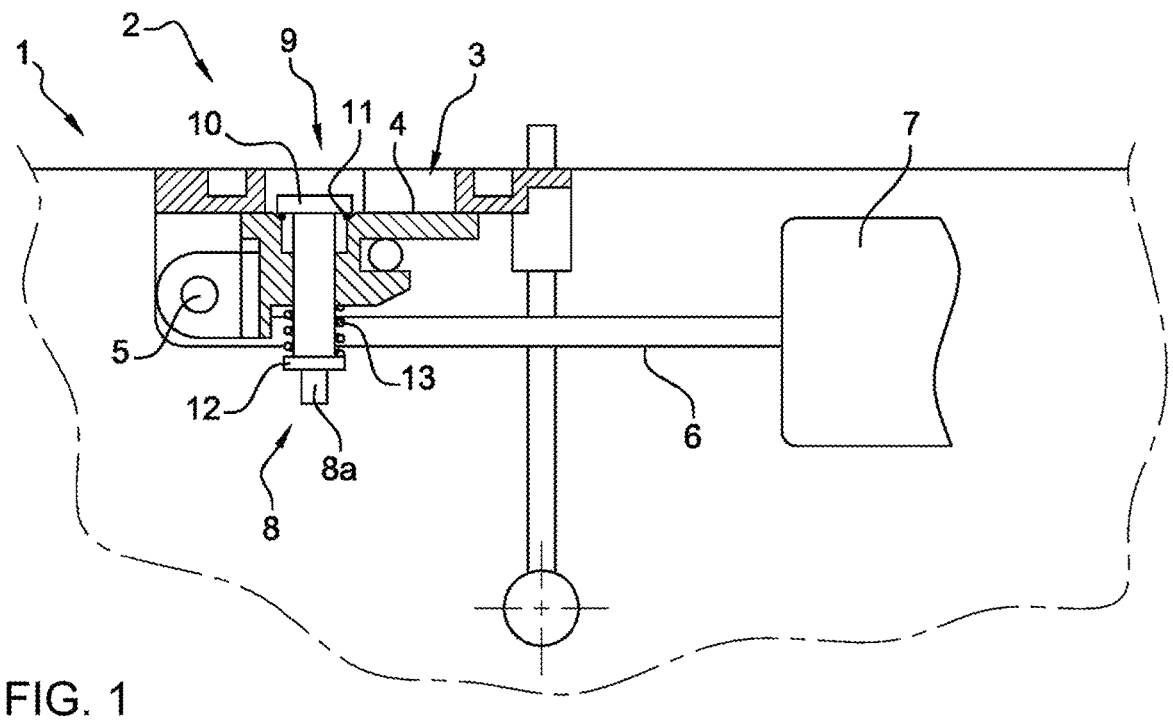
FIG. 1 is a schematic representation illustrating a first embodiment of the invention, the valve being controlled by a spring.

The present invention concerns the technical domain of fuel tanks, of an aircraft for example, and more particularly it concerns a fuel tank equipped with a venting system for equalizing the internal pressure of the tank to atmospheric pressure, as a function of fuel consumption, in order to prevent any overpressure within said tank.

The invention finds particularly advantageous application in a fuel tank subjected to an inerting system by means of the injection of an inert gas.

Known from the prior art is a fuel tank, of an aircraft for example, equipped with a venting system of the type comprising a flap for closing an opening to the exterior made in the tank. In particular, the flap is subjected to a float, and is mounted in a hinged manner within the tank so as to adopt a closed position, pushed by the float when the level of fuel in the tank reaches a certain threshold, and an open vented position, driven by the float when the level of fuel is below said threshold.

In other words, during the phase of filling the fuel tank, the float valve remains open until the level of fuel, which is increasing, pushes the float and drives the flap in order to close the opening of the tank, making it possible to prevent fuel from being evacuated from the tank through said opening. Subsequently, in flight, and more particularly in fuel consumption phase, the level of fuel decreases so that the float drives the flap open by the effect of gravity, so that the flap adopts the open vented position and enables, by admission of exterior air, equalization of the internal pressure of the tank and the atmospheric pressure.

However, this type of tank, equipped with a venting system, has certain disadvantages inherent to the structure thereof.

Indeed, the movements of the fuel inside the tank, for example during pitching a rolling of an aircraft comprising such a tank, can cause, by action on the float, undesired closing of the flap. In particular, this is a major disadvantage when said tank is subjected to an inerting system by means of the injection of an inert gas. Indeed, in the domain of aeronautics, and in order to meet the new requirements concerning aircraft safety, and more particularly to avoid the risks of flammability of the mixture of air and fuel vapor in the tanks, the tanks are subjected to inerting systems, active under some conditions, such as for example when the oxygen content in the tank exceeds a certain threshold. Thus, the injection of inert gas while the flap is unintentionally closed causes the pressurization of the tank, which pressure maintains the flap in the closed position, even when the fuel is no longer exerting force on the float.

The result is that the venting function of the tank is no longer ensured, and the pressure increases inside the tank, which can have disastrous consequences.

One of the purposes of the invention, therefore, is to remedy these disadvantages by proposing a fuel tank equipped with a venting system, which is safe and which makes it possible to ensure—optimally and in every circumstance—the venting function of said tank, in order to avoid any overpressure within said tank.

To that end, a fuel tank has been developed comprising a venting system comprising a flap for closing an opening made in the tank. The flap is subjected to a float, and is mounted in a hinged manner in the tank so as to adopt a closed position, pushed by the float when the level of fuel in the tank reaches a certain threshold, and an open vented position, driven by the float when the level of fuel is below said threshold.

The flap comprises a valve controlled by means capable of opening the valve when the flap is in the closed position while the level of fuel is below said threshold, in order to prevent overpressure within said tank.

In this way, when the flap is undesirably maintained in the closed position by the force exerted by internal pressure, the venting function of the tank is ensured by the valve. Thus, the tank according to the invention is safe.

According to a first embodiment of the tank according to the invention, the valve is in the form of a rod mounted sliding within an orifice of the flap, between a position of opening and a position of closing the orifice. The rod comprises a first end with a shoulder intended to act as a stop for the closed position of the rod, and a second end with a shoulder forming a seat for a compression spring arranged around the rod and pressed against the flap in order to maintain the rod in the closed position. Thus, when the force exerted by the internal pressure on the valve exceeds the sum of the forces exerted on the valve by the atmospheric pressure and the spring, said valve is pushed into the open position, against said spring, and ensures venting of the fuel tank in order to prevent overpressure within said tank.

According to a second embodiment of the tank according to the invention, the valve is subjected to a second float and mounted in a hinged manner in the tank such that said valve adopts a closed position, by being pushed by the second float when the level of fuel in the tank reaches a certain threshold, and an open vented position in order to prevent overpressure within said tank, by being driven by the second float when the level of fuel is below said threshold and the force exerted by the internal pressure on the valve is less than the sum of the forces exerted on the valve by the atmospheric pressure and by the weight of the second float.

Advantageously, in this embodiment, the second float is subjected to the valve by means of an arm forming a lever arm for augmenting the force exerted by the second float on the valve.

Figure 2:
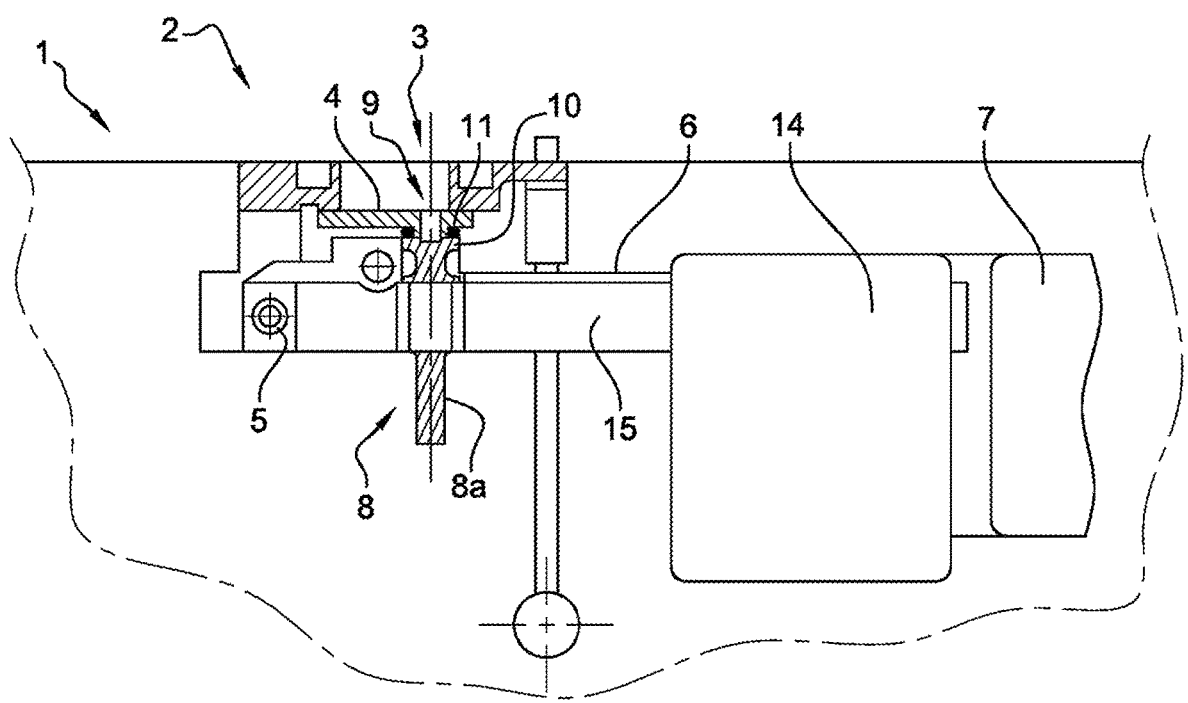
FIG. 2 is a schematic representation illustrating a first embodiment of the invention, the valve being controlled by a second float.

Other advantages and characteristics will be seen from the following description of several embodiments, provided by way of non-limiting examples, of the fuel tank according to the invention, with reference to the appended drawings wherein:

FIG. 1 is a schematic representation illustrating a first embodiment of the invention, the valve being controlled by a spring, FIG. 2 is a schematic representation illustrating a first embodiment of the invention, the valve being controlled by a second float.

The invention concerns a tank (1), intended to receive fuel, and equipped with a venting system (2) for equalizing the internal pressure of the tank (1) to atmospheric pressure and avoiding any said tank.

The invention concerns a tank (1) for any type of aircraft, civilian or military, such as an airplane or a helicopter for example.

In a known way, the tank (1) comprises an opening (3) providing communication with the exterior of said tank (1) for the venting thereof. The venting system (2) of the tank (1) comprises a closing flap (4), mounted pivoting with respect to the tank (1) and around a pin (5) in order to adopt a closed position wherein it closes the opening (3) of the tank (1), and an open venting position wherein it frees said opening (3).

The flap (4) is extended at the lower part by an arm (6) that terminates in a float (7). When the flap (4) is in the closed position, the arm (6) is essentially horizontal and in proximity to the opening (3) so that when the tank (1) is full, the action of the fuel on the float (7) maintains the flap (4) in the closed position to prevent any leakage of fuel through the vent opening (3).

When the level of fuel decreases, the float (7) descends together with the level of fuel and causes the pivoting and opening of the flap (4) around the pin (5) for venting the tank (1).

According to the invention, the flap (4) comprises a valve (8) in the form of a rod (8a) intended to ensure the venting of the tank (1) when the flap (4) is in the closed position and the level of fuel is below the threshold.

More specifically, according to a first embodiment of the invention, illustrated in FIG. 1, the valve rod (8a) is mounted sliding within an orifice (9), in communication with the exterior, made in said flap (4). The valve rod (8a) is capable of sliding between a position of opening and a position of closing the orifice (9). At an upper end, the valve rod (8a) comprises an upper shoulder (10) intended to act as a stop for the closed position of said valve rod (8a). Said upper shoulder (10) advantageously comprises an O-ring (11) for sealing the valve rod (8a) in the closed position. The valve rod (8a) comprises a lower end comprising a lower shoulder (12) forming a seat for a compression spring (13), arranged around the valve rod (8a), on the one hand pressed against said lower shoulder (12), and on the other hand pressed against the flap (4). The compression spring (13) maintains the valve (8) in the closed position. The valve (8) is capable of adopting the open position, pushed by the force exerted by the internal pressure of the tank (1), against said compression spring (13).

In effect, when the pressure increases inside the tank (1), for example when an inerting system injects inert gas into the tank (1), while the flap (4) is in the closed position by the action of the fuel on the float (7), due to the pitch or role of the aircraft, for example, the injection of said gas causes an increase in the internal pressure, and the force exerted by said internal pressure maintains the flap (4) in the closed position, even when the fuel is no longer acting on the float (7) of said flap (4).

Thus, according to the invention, the internal pressure also exerts a force on the valve rod (8a) and tends to cause it to adopt the open position. Thus, when the force exerted by the internal pressure of the tank (1) on the valve rod (8a) exceeds the sum of the forces that maintain the valve rod (8a) in the closed position, namely those forces exerted by the atmospheric pressure and by the compression spring (13), the valve (8) is pushed into the open position, against said compression spring (13), and ensures a venting of the fuel tank (1).

In this way, it can be seen that when the internal pressure of the tank (1) reaches a certain threshold, the valve (8) is opened and venting is ensured in a secure manner Of course, it is the compression spring (13) that determines the pressure at which the valve is to be opened (8). Indeed, the spring (13) is dimensioned to exert a force in order to maintain the valve (8) in the closed position, said force being equal to the force exerted by the difference between a first internal pressure threshold and the atmospheric pressure. Thus, it is possible to dimension the spring (13) so as to allow the opening of the valve (8) when the flap (4) is in the closed position and the level of fuel is below a defined threshold, from a certain desired internal pressure threshold. Of course, a person skilled in the art will know how to dimension said spring (13) based upon the desired internal pressure threshold.

Based upon the foregoing, when the tank (1) comprises an internal pressure above the internal pressure threshold, the valve (8) is pushed into the open position, against the spring (13), by the force exerted by the internal pressure, and ensures a venting of the fuel tank (1).

According to a second embodiment of the invention illustrated in FIG. 2, the operation of the flap (4) and the float (7) remain the same, even though the valve rod (8a) is controlled by a second float (14). Indeed, in this embodiment, the valve rod (8a) is not mounted sliding within the orifice (9) of the flap (4), but is mounted pivoting with respect to the flap (4) around the pin (5) to adopt a closed position wherein the upper shoulder (10) closes the orifice (9), and an open venting position wherein said valve rod (8a) frees said orifice (9).

More precisely, the valve rod (8a) is attached perpendicularly to a second arm (15) extended at one end by the second float (14) and attached, pivoting around the pin (5), at another end to the flap (4). Thus, the valve rod (8a) is capable of adopting the open position, driven in rotation by the weight of the second float (14), and the closed position, pushed by the second float when the level of fuel in the tank (1) reaches a certain threshold.

Thus, when the flap (4) is undesirably maintained in the closed position by the internal pressure, and the level of fuel is below the threshold, the weight of the second float (14) augmented by the leverage effect of the arm (15) causes the opening of the valve (8), while the force exerted by the internal pressure on the valve (8) is lower than the sum of the forces that tend to move the valve (8) towards the open position, namely those forces exerted by the atmospheric pressure and by the weight of the second float (14).

The internal pressure that exerts a force on the valve (8), equal to the sum of the forces that tend to move the valve (8) to the open position, corresponds to the internal pressure threshold.

In this way, in the event the flap (4) is undesirably maintained in the closed position, venting is ensured over a range of pressures, until the internal pressure exceeds the internal pressure threshold.

It is obvious, of course, that it is the weight of the second float (14) that determines the internal pressure threshold at which the valve (8) is moved to the closed position. Indeed, the second float (14) and the length of the arm thereof are dimensioned in order to exert a force tending to open the valve (8), greater than the force corresponding to the difference between the forces exerted on the valve (8) by the internal pressure threshold and the atmospheric pressure. Thus, it is possible to dimension the second float (14) and the lever arm (15) thereof, such as to allow for the opening of the valve (8), when the flap (4) is in the closed position and the level of fuel is below a defined threshold, up to a certain desired internal pressure threshold. Of course, a person skilled in the art will know how to dimension said spring (14) and the arm (15) thereof, based upon the desired internal pressure threshold.

It can be seen from the foregoing that the invention provides a fuel tank capable of ensuring venting safely and under any circumstance, in order to prevent any overpressure within said tank.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A fuel tank comprising:
   a tank;
   a venting system of said tank comprising:
      a float mounted in a hinged manner in said tank;
      a flap mechanically coupled to said float, said flap to close an opening in said tank in a closed flap position;
      a valve disposed in said flap, said valve mechanically coupled to a second float mounted in a hinged manner in said tank, said valve comprising an open valve position to open an orifice in said flap and a closed valve position to close said orifice in said flap;
   wherein said valve adopts a closed position, being pushed by the second float when a level of fuel in the tank reaches a certain threshold; and
   wherein said valve adopts an open venting position during the closed flap position in order to prevent overpressure within said tank, being driven by the second float when the level of fuel is below said threshold and a force exerted by an internal pressure on the valve is less than a sum of forces exerted on said valve by an atmospheric pressure and by a weight of the second float.

2. The fuel tank according to claim 1, wherein the second float is subjected to the valve by means of an arm forming a lever in order to increase the force exerted by the second float on the valve.

* * * * *